US012507871B2

(12) United States Patent
Shen et al.

(10) Patent No.: US 12,507,871 B2
(45) Date of Patent: Dec. 30, 2025

(54) MAGNETIC CONTROL DEVICE AND CAPSULE ENDOSCOPE CONTROL SYSTEM

(71) Applicant: ANKON MEDICAL TECHNOLOGIES (SHANGHAI) CO., LTD, Shanghai (CN)

(72) Inventors: Yueyue Shen, Shanghai (CN); Shaobang Zhang, Shanghai (CN); Xiaodong Duan, Pleasanton, CA (US)

(73) Assignees: ANKON MEDICAL TECHNOLOGIES (SHANGHAI) CO., LTD., Shanghai (CN); ANX IP HOLDING PTE. LTD, Singapore (SG)

( * ) Notice: Subject to any disclaimer, the term of this patent is extended or adjusted under 35 U.S.C. 154(b) by 397 days.

(21) Appl. No.: 18/015,531

(22) PCT Filed: Jul. 9, 2021

(86) PCT No.: PCT/CN2021/105580
§ 371 (c)(1),
(2) Date: Jan. 10, 2023

(87) PCT Pub. No.: WO2022/007961
PCT Pub. Date: Jan. 13, 2022

(65) Prior Publication Data
US 2023/0255453 A1 Aug. 17, 2023

(30) Foreign Application Priority Data

Jul. 10, 2020 (CN) .......................... 202010665056.4

(51) Int. Cl.
*A61B 1/00* (2006.01)
*A61B 1/04* (2006.01)

(52) U.S. Cl.
CPC ...... *A61B 1/00158* (2013.01); *A61B 1/00027* (2013.01); *A61B 1/041* (2013.01)

(58) Field of Classification Search
CPC .. A61B 1/00027; A61B 1/00158; A61B 1/041
See application file for complete search history.

(56) References Cited

U.S. PATENT DOCUMENTS

| 2008/0300458 A1* | 12/2008 | Kim ........................ A61B 34/73 600/118 |
| 2015/0380140 A1* | 12/2015 | Duan ...................... H01F 7/0257 600/109 |
| 2019/0104994 A1 | 4/2019 | Valdastri et al. |

FOREIGN PATENT DOCUMENTS

| CN | 201732868 U | 2/2011 |
| CN | 103222842 A | 7/2013 |

(Continued)

*Primary Examiner* — Aaron B Fairchild
(74) *Attorney, Agent, or Firm* — Treasure IP Group, LLC

(57) ABSTRACT

A magnetic control device and a capsule endoscope control system are provided. The magnetic control device comprises: a first support, a second support, a magnetic component, a first driving mechanism and a second driving mechanism. The magnetic component comprises a housing portion and a shaft portion connected to the housing portion, the housing portion is provided with a magnet and a drive fitting portion, and the shaft portion is rotatably connected to the second support. The first driving mechanism is disposed on the first support and is connected to the second support, the second driving mechanism is disposed on the second support and is connected to the magnetic component. The first driving mechanism drives the second support to drive the magnetic component to rotate around a first axis, the second driving mechanism drives the magnetic component to rotate around a second axis, the first axis intersects the second axis.

19 Claims, 7 Drawing Sheets

(56) References Cited

FOREIGN PATENT DOCUMENTS

| | | |
|---|---|---|
| CN | 104508346 A | 4/2015 |
| CN | 106580240 A | 4/2017 |
| CN | 110809425 A | 2/2020 |

* cited by examiner

MAGNETIC CONTROL DEVICE AND CAPSULE ENDOSCOPE CONTROL SYSTEM

CROSS-REFERENCE OF RELATED APPLICATIONS

The application is a National Phase Application of PCT International Application No. PCT/CN2021/105580, International Filing Date Jul. 9, 2021, published Jan. 13, 2022 as International Publication Number WO2022/007961A1, which claims priority from Chinese Patent Application No. 202010665056.4, filed Jul. 10, 2020, all of which are incorporated herein by reference in their entirety.

FIELD OF INVENTION

The present invention relates to the technical field of capsule endoscope equipment, and more particularly to a magnetic control device and a capsule endoscope control system.

BACKGROUND

Currently, capsule endoscopy is a relatively advanced diagnostic and therapeutic means on the market for routine examination of human digestive tract. Compared with traditional intubation endoscope, swallowing a capsule endoscope does not cause physical and psychological discomfort to a patient, and also reduce the possibility of cross-infection.

Magnetically controlled capsule endoscope is a capsule endoscope that enables an active control of the examination field of view by an operator on a control console. At present, a common means for control is to place a magnet outside a human body, and through an orderly changing magnetic field around the magnet caused by changing the orientation and posture of the magnet, a magnet built in the magnetically controlled capsule endoscope is controlled to drive the capsule endoscope to move, so as to realize a change of the examination field of view of the capsule endoscope.

In the prior art, the design of a transmission chain of a magnetic control device is complicated, resulting in a large volume of the magnetic control device, especially a large circumferential size, which requires a lot of space.

SUMMARY OF THE INVENTION

The present invention provides a magnetic control device and a capsule endoscope control system to simplify a design structure of a transmission chain, reduce the volume of the magnetic control device and save space.

The above and other objectives can be achieved through features in independent claims. Further means of achievement are embodied in the dependent claims, specification and accompanying drawings.

In a first aspect, the present invention provides a magnetic control device, and the magnetic control device comprises:
  a support assembly, comprising a first support and a second support;
  a magnetic component, comprising a housing portion and a shaft portion connected to the housing portion, wherein the housing portion is provided with a magnet and a drive fitting portion, and the shaft portion is rotatably connected to the second support;
  a first driving mechanism disposed on the first support and drivingly connected to the second support to drive the magnetic component to rotate around a first axis;
  a second driving mechanism disposed on the second support and drivingly connected to the drive fitting portion to drive the magnetic component to rotate around a second axis;
  the first axis intersects the second axis.

In the embodiment, the drive fitting portion is arranged on the housing portion rather than the shaft portion, so that the magnetic component is used as a portion of a transmission chain, the volume of the magnetic control device is reduced, and the space is saved. In addition, the first driving mechanism and the second driving mechanism of the magnetic control device are arranged separately, that is, the first driving mechanism is arranged on the first support, and the second driving mechanism is arranged on the rotatable second support, so that the design structure of the transmission chain is simplified, the volume of the magnetic control device is reduced, and the space is saved.

In one possible embodiment, the drive fitting portion is arranged around the housing portion with the second axis as a center line;
  the second driving mechanism drives the drive fitting portion to rotate to drive the housing portion to rotate around the second axis.

In the embodiment, the drive fitting portion is annularly arranged along the housing portion, and the second driving mechanism drives the drive fitting portion to rotate, so that the housing portion can be driven to rotate integrally.

In one possible embodiment, the second driving mechanism comprises a second driving member and a second transmission assembly. An input end of the second transmission assembly is connected to the second driving member and an output end of the second transmission assembly is connected to the drive fitting portion of the housing portion. The second driving member drives the second transmission assembly so that the second transmission assembly drives the drive fitting portion and the housing portion to rotate.

In one possible embodiment, the drive fitting portion comprises a first gear, and the first gear is sleeved on the housing portion; the second driving mechanism comprises at least a second gear, and the second gear is meshed with the first gear;
  or, the drive fitting portion comprises a first belt pulley, and the first belt pulley is sleeved on the housing portion; the second driving mechanism comprises a second belt pulley and a belt, and the belt is sleeved on the first belt pulley and the second belt pulley.

In the embodiment, the power is transmitted through a gear mechanism or a belt transmission mechanism, ensuring a stable and reliable power transmission, while not occupying too much space.

In one possible embodiment, the second support comprises a connecting plate and side plates respectively arranged on two opposite sides of the connecting plate;
  the first driving mechanism is drivingly connected to the connecting plate;
  the housing portion is located between the side plates, and the shaft portion is rotatably connected to the side plates;
  the second driving mechanism is connected to the connecting plate and/or the side plates.

In the embodiment, the housing portion is located between the side plates, the shaft portion is rotatably connected to the side plates, and the second driving mechanism is directly connected to the housing portion, so that the whole structure of the magnetic control device is compact, and the size of the magnetic control device is reduced.

In one possible embodiment, the second driving mechanism comprises a second driving member, a rotor and a permanent magnet;

the second driving member is drivingly connected to the rotor, and the permanent magnet is mounted on the rotor;

the second driving member drives the rotor, so that the rotor drives the permanent magnet to rotate, and then drives the magnetic component to rotate.

In the embodiment, the magnetic component is driven to move by the permanent magnet, eliminating the need for a transmission assembly, simplifying the internal transmission chain design, and reducing the size of the magnetic control device.

In one possible embodiment, the rotor comprises a first half shaft body and a second half shaft body which are connected to each other;

the first half shaft body has a first groove, and the second half shaft body has a second groove;

when the first half shaft body is connected to the second half shaft body, the first groove and the second groove are connected to form an accommodating cavity, and the permanent magnet is fixedly arranged in the accommodating cavity.

In the embodiment, the rotor comprises two half shaft bodies, the middle of the two half shaft bodies connected forms an accommodating cavity, and the permanent magnet can be accommodated in the accommodating cavity. In this way, the permanent magnet can be located in the middle of the rotor to facilitate the driving of the magnetic component.

Preferably, the rotor further comprises a third gear;

the third gear is sleeved on the first half shaft body or the second half shaft body;

the second driving mechanism comprises a fourth gear, and the second driving member is drivingly connected to the fourth gear, and the fourth gear is meshed with the third gear.

In the embodiment, the second driving member and the rotor transmit power through the gear mechanism, so that power transmission is stable, and the rotating position of the magnetic component can be accurately adjusted.

In one possible embodiment, the magnetic control device further comprises an electric slip ring;

the electric slip ring comprises a first ring body and a second ring body which can rotate relative to each other;

the first ring body is connected to the first support and is connected to a power supply unit of the magnetic control device through a first cable;

the second ring body is connected to the second support and is connected to the second driving mechanism through a second cable.

The electric slip ring can comprise a PCB type slip ring, so that the problem of cable intertwining when the first support and the second support rotate relatively can be solved.

In one possible embodiment, both the first ring body and the second ring body are annular sheet-shaped bodies; and the electric slip ring comprises a PCB plate type slip ring, and the sum of the thicknesses of the first ring body and the second ring body is less than or is equal to 8.5 mm.

In the embodiment, the thickness of the electric slip ring is small, so that the structure of the magnetic control device is compact, and the volume of the magnetic control device is favorably reduced.

When the magnetic control device is powered on and initialized, an initial "zero" position is required, and at the zero position, the N pole of the magnet faces upward and the S pole of the magnet faces downward. In other cases, other positions can be selected as the zero position, for example, the S pole of the magnet faces upward, the N pole faces downward, as long as it is convenient to control the capsule endoscope.

In one possible embodiment, the magnetic control device comprises a first zeroing mechanism and a second zeroing mechanism. The first zeroing mechanism comprises a first code disk and a first photoelectric switch;

the first code disk is connected to the first support, and the first photoelectric switch is connected to the second support;

the first photoelectric switch comprises a first transmitting portion and a first receiving portion which are respectively disposed on two sides of the first code disk, and the first code disk is provided with a first through portion;

when the second support rotates to a position where the first receiving portion can receive a signal from the first transmitting portion, the magnetic component is located at an initial working position in a first direction.

The second zeroing mechanism comprises a second code disk and a second photoelectric switch;

the second code disk is connected to the shaft portion, and the second photoelectric switch is connected to the second support;

the second photoelectric switch comprises a second transmitting portion and a second receiving portion which are respectively disposed on two sides of the second code disk, and the second code disk is provided with a second through portion;

when the housing portion rotates to a position where the second receiving portion can receive a signal from the second transmitting portion, the magnetic component is located at an initial working position in a second direction.

In the embodiment, the first zeroing mechanism and the second zeroing mechanism are so arranged that when the magnetic control device is powered on and initialized, the magnetic component is rapidly adjusted to be at an initial "zero" position, and subsequent operations are facilitated.

In a second aspect, the present invention provides a capsule endoscope control system, the capsule endoscope control system comprises a three-axis displacement base and the magnetic control device, wherein the magnetic control device is connected to the three-axis displacement base.

The technical solution provided by the present invention can achieve the following beneficial effects.

The magnetic control device comprises a first support, a second support, a magnetic component, a first driving mechanism and a second driving mechanism. The magnetic component comprises a housing portion and a shaft portion connected to the housing portion, wherein the housing portion is provided with a magnet and a drive fitting portion, and the shaft portion is rotatably connected to the second support. The first driving mechanism is disposed on the first support and is drivingly connected to the second support. The second driving mechanism is disposed on the second support and is drivingly connected to the magnetic component. The first driving mechanism drives the second support to drive the magnetic component to rotate around a first axis, and the second driving device drives the magnetic component to rotate around a second axis. In the present invention, the drive fitting portion is disposed on the housing portion rather than the shaft portion, so that the volume of the magnetic control device is reduced, and the space is saved.

In the present invention, the first driving mechanism and the second driving mechanism of the magnetic control device are arranged separately, that is, the first driving mechanism is arranged on the first support, and the second driving mechanism is arranged on the rotatable second support, so that the design structure of the transmission chain is simplified, the volume of the magnetic control device is reduced, and the space is saved.

It should be understood that the above description and the details to be set forth in the following text are only exemplary, which are not intended to limit the present invention.

Figure 1:
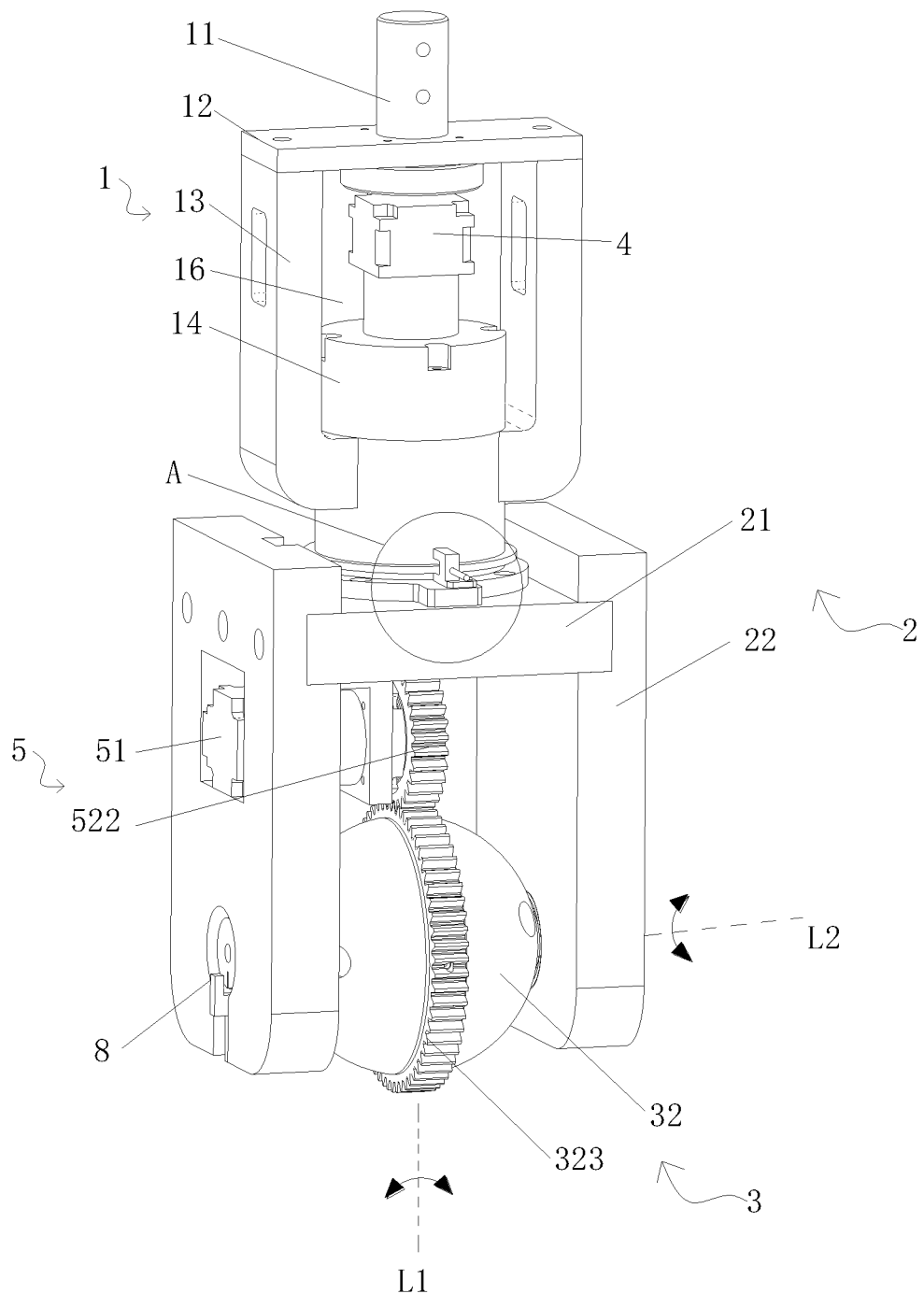
FIG. 1 is a schematic view showing a first three-dimensional structure of a magnetic control device according to the embodiments of the present invention.

Marks in the drawings:
1—First support;
11—Suspension shaft;
12—Suspension plate;
13—Upper enclosing plate;
14—Motor fixing member;
15—First bearing;
16—Mounting space;
2—Second support;
21—Connecting plate;
22—Side plate;
23—Mounting base;
24—Bearing seat;
25—Second bearing;
3—Magnetic component;
31—Magnet;
32—Housing;
321—Housing portion;
322—Shaft portion;
323—Drive fitting portion;
4—First driving mechanism;
41—First driving member;
42—First transmission assembly;
421—First coupling;
422—Transmission block;
423—Transmission shaft;
5—Second driving mechanism;
51—Second driving member;
52—Second transmission assembly;
521—Second coupling;
522—Second gear;
523—Second belt pulley;
524—Belt;
53—Rotor;
531—First half shaft body;
5311—First groove;
532—Second half shaft body;
5321—Second groove;
533—Third gear;
534—Left bearing;
535—Right bearing;
536—Key;
537—Stop nut;
54—Permanent magnet;
55—Fourth gear;
6—Electric slip ring;
61—First ring body;
62—Second ring body;
7—First zeroing mechanism;
71—First code disk;
711—First through portion;
72—First photoelectric switch;
721—First transmitting portion;
722—First receiving portion;
8—Second zeroing mechanism;
81—Second code disk;
811—Second through portion;
82—Second photoelectric switch;
822—Second transmitting portion;
823—Second receiving portion;
L1—First axis;
L2—Second axis.

The drawings herein are incorporated in and constitute a part of the specification, illustrate the embodiments consistent with the present invention and are used together with the specification to explain the principles of the present invention.

DETAILED DESCRIPTION

The present invention can be understood and appreciated more fully from the following detailed description taken in conjunction with the accompanying drawings.

It should be clear that the described embodiments are only part of the embodiments of the present invention. Based on the embodiments in the present invention, all other embodiments obtained by ordinary technicians in the art without doing creative work belong to the scope of protection in the present invention.

The present invention is described in detail below with reference to the accompanying drawings and preferred embodiments.

Magnetically controlled capsule endoscope is a capsule endoscope that enables an active control of the examination field of view by an operator on a control console. At present, a common means for control is to place a magnet outside a human body, and through an orderly changing magnetic field around the magnet caused by changing the orientation and posture of the magnet, a magnet built in the magnetically controlled capsule endoscope is controlled to drive the capsule endoscope to move, so as to realize a change of the examination field of view of the capsule endoscope.

In the prior art, a transmission chain of a magnetic control device of a capsule endoscope control system is complicated in design, large in size, particularly large in circumferential size, and occupies a large amount of space.

In view of this, the present invention provides a magnetic control device and a capsule endoscope control system, which can solve the above technical problem.

Figure 3:
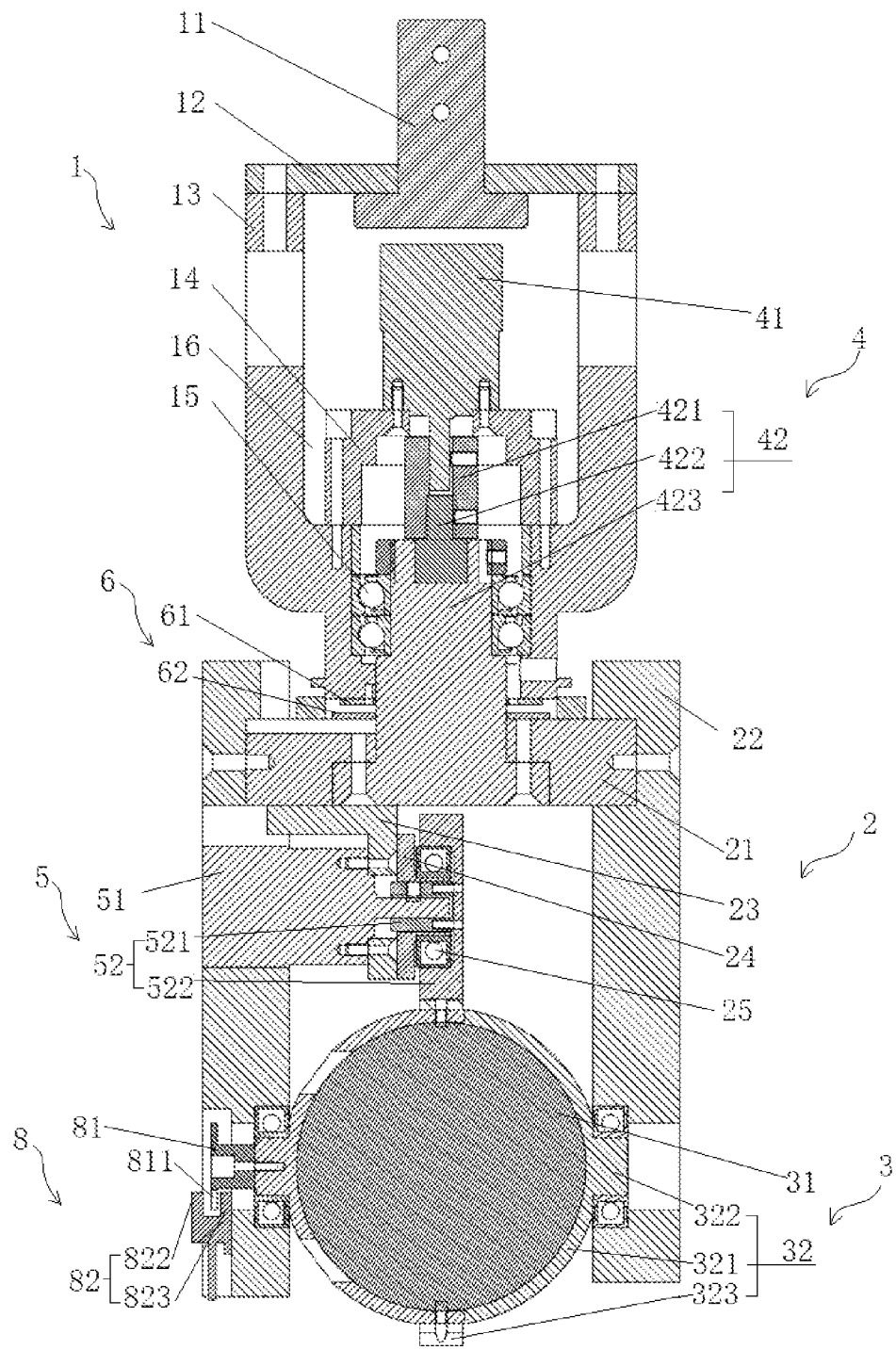
FIG. 3 is a sectional view of FIG. 1.

Referring to FIG. 1 and FIG. 3, showing a magnetic control device according to an embodiment of the present invention. The magnetic control device comprises a support assembly, a magnetic component 3, a first driving mechanism 4 and a second driving mechanism 5. The support assembly comprises a first support 1 and a second support 2. The magnetic component 3 comprises a housing 32 and a magnet 31. The housing 32 comprises a housing portion 321 and a shaft portion 322 connected to the housing portion 321. The magnet 31 is disposed in the housing portion 321, and further a drive fitting portion 323 is disposed on the housing portion 321. The shaft portion 322 is rotatably connected to the second support 2. The first driving mechanism 4 is disposed on the first support 1 and is drivingly connected to the second support 2. The second driving mechanism 5 is disposed on the second support 2 and is drivingly connected to the drive fitting portion 323. The first driving mechanism 4 drives the second support 2 to drive the magnetic component 3 to rotate around a first axis L1, and the second driving mechanism 5 drives the magnetic component 3 to rotate around a second axis L2. The first axis L1 intersects the second axis L2. Preferably, the first axis L1 and the second axis L2 are perpendicular to each other.

In the prior art, the second driving mechanism 5 needs to act on the shaft portion 322 of the magnetic component 3 through a long transmission chain, so that the extension length of the magnetic control device along the axial direction of the magnetic component 3 is large, which is not conducive to compact design. However, the present invention is different from the prior art in that the drive fitting portion 323 is disposed on the housing portion 321, and the second driving mechanism 5 directly drives the drive fitting portion 323 to drive the housing portion 321 to rotate, thereby reducing the extension length of the magnetic control device along the first axis L1 of the magnetic component 3 and saving space.

In addition, in the present invention, the first driving mechanism 4 and the second driving mechanism 5 are separately disposed on the magnetic control device, that is, the first driving mechanism 4 is disposed on the first support 1, and the second driving mechanism 5 is disposed on the rotatable second support 2, so that the design structure of the transmission chain is simplified.

It should be noted that the term "A is drivingly connected to B" in the present invention can be understood as "A is a driving member, B is a driven member, and A can drive B and drive B to move, such as driving B to rotate, move, etc.".

Referring to FIG. 1 and FIG. 3, in one possible embodiment, the drive fitting portion 323 is disposed around the housing portion 321 with the second axis L2 as a center line, and the second driving mechanism 5 drives the drive fitting portion 323 to rotate, so as to drive the housing portion 321 to rotate around the second axis L2.

In the embodiment, the drive fitting portion 323 is annularly disposed along the housing portion 321. The second driving mechanism 5 drives the drive fitting portion 323 to rotate, that is, the housing portion 321 is driven to rotate around the second axis L2, so as to adjust the rotation angle of the magnet 31.

Figure 2:
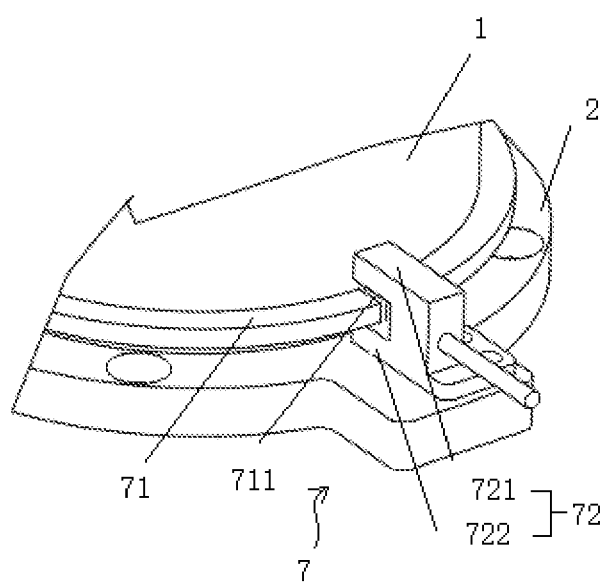
FIG. 2 is an enlarged view of a portion A in FIG. 1.

Referring to FIG. 1 and FIG. 2, in one possible embodiment, the drive fitting portion 323 comprises a first gear, and the first gear is sleeved on the housing portion 321; and the second driving mechanism 5 comprises at least a second gear 522, and the second gear 522 is meshed with the first gear. In the embodiment, the power is transmitted through a gear mechanism, ensuring a stable and reliable power transmission, while not occupying the space. In addition, in other embodiments of the present invention, the second driving mechanism 5 may comprises a transmission gear set (not shown in FIGs), and the transmission gear set is meshed with the first gear on the housing portion 321, so as to control the magnetic component 3.

Figure 4:
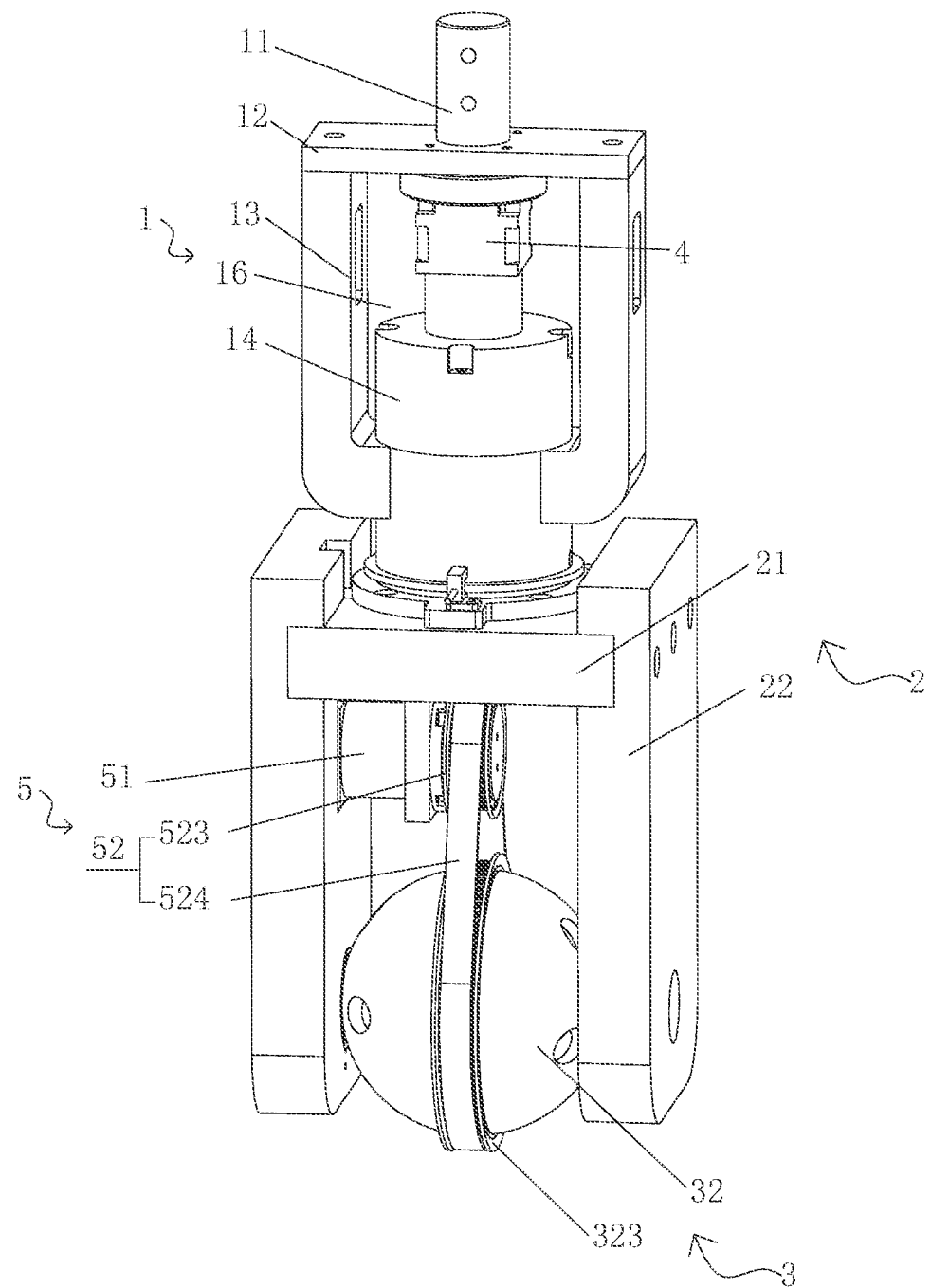
FIG. 4 is a schematic view showing a second three-dimensional structure of the magnetic control device according to the embodiments of the present invention.

Optionally, referring to FIG. 4, in another possible embodiment, the drive fitting portion 323 may comprise a first belt pulley, and the first belt pulley is sleeved on the housing portion 321. The second driving mechanism 5 comprises a second belt pulley 523 and a belt 524. The belt 524 is sleeved on the first belt pulley and the second belt pulley 523.

In the embodiment, compared with gear transmission, a belt transmission method is used, which has the advantages of stable transmission, simple structure, low cost and more convenient use and maintenance.

Figure 5:
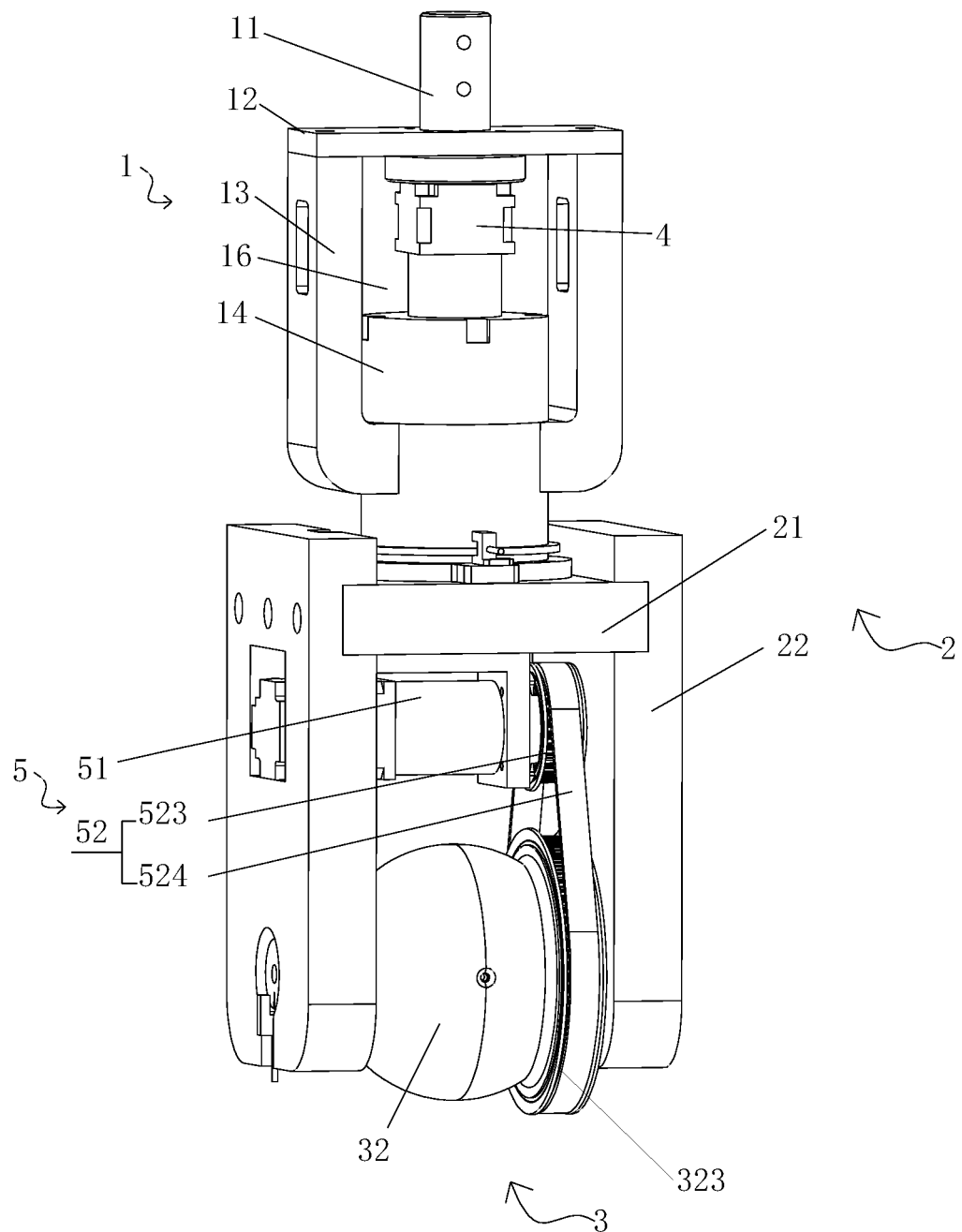
FIG. 5 is a schematic view showing a third three-dimensional structure of the magnetic control device according to the embodiments of the present invention.

Alternatively, referring to FIG. 1 and FIG. 4, the drive fitting portion 323 may be disposed around a middle part of the housing portion 321. Referring to FIG. 5, the second driving mechanism 5 may also be offset from the middle part of the housing portion 321, so that a larger space can be reserved for an optional reducer with a larger reduction ratio for the second driving mechanism 5, which can reduce the demand on the output force of the second driving mechanism 5.

In one possible embodiment, the housing portion 321 may be an integrally formed spherical structure, the magnet 31 is in the housing portion 321, and the drive fitting portion 323 is fixedly mounted on the housing portion 321. Alternatively, the housing portion 321 may also comprise a first housing and a second housing, wherein the first housing and the second housing are snap fit together, forming a mounting cavity between the two. The magnet 31 is accommodated in the mounting cavity, and the drive fitting portion 323 is fixedly mounted on the first housing and/or the second housing. The housing portion 321 further comprises a fixing member (not shown in FIGs) disposed in the mounting cavity for fixing the magnet 31 and preventing the magnet 31 from rotating relative to the mounting cavity.

Referring to FIG. 1 and FIG. 3, in one possible embodiment, the first support 1 comprises a suspension shaft 11, a suspension plate 12 and an upper enclosing plate 13, wherein the suspension shaft 11 is connected to a three-axis displacement base of the capsule endoscope control system, the suspension plate 12 is connected to the suspension shaft 11, the upper enclosing plate 13 is connected to the suspension plate 12, and a mounting space 16 is formed in the upper enclosing plate 13. The first driving mechanism 4 comprises a first driving member 41 and a first transmission assembly 42. The first driving member 41 is accommodated in the mounting space 16, an input end of the first transmission assembly 42 is connected to the first driving member 41, and an output end of the first transmission assembly 42 is connected to the second support 2. The three-axis displacement base is usually fixed on the ground, usually mounted on the ground, and can drive the magnetic control device to move back and forth, up and down, left and right, which is convenient for examination.

In the embodiment, the first driving member 41 is accommodated in the mounting space 16, and the first support 1 can protect the first driving member 41. The first driving member 41 is accommodated in the mounting space 16, so that the structure is compact, which is beneficial to reducing the volume of the magnetic control device.

Referring to FIG. 3, in one possible embodiment, the first support 1 further comprises a motor fixing member 14, a bearing seat and a first bearing 15 arranged in the bearing seat, the first transmission assembly 42 comprises a first coupling 421, a transmission block 422 and a transmission shaft 423. The first driving member 41 can be a motor, the motor is connected to the motor fixing member 14, the first coupling 421 is connected to a rotating shaft of the motor, the transmission block 422 is connected to the first coupling 421, the transmission shaft 423 is connected to the transmission block 422. The transmission shaft 423 extends through the first bearing 15, and is connected to the second support 2, for example, connected to the connecting plate 21 of the second support 2. The magnetic control device further comprises an electric slip ring 6. The electric slip ring 6 comprises a first ring body 61 and a second ring body 62 which can rotate relative to each other. The first ring body 61 and the second ring body 62 are sleeved on the transmission shaft 423, the first ring body 61 is connected to the first support 1 and is connected to a power supply unit of the magnetic control device through a first cable, and the second ring body 62 is connected to the second support 2 and is connected to the second driving mechanism 5 through a second cable. It should be noted that the above power supply unit may be a power supply of the magnetic control device in the present invention (including a power supply provided on the magnetic control device), or may be an external power supply on a device for assembling the magnetic control device, or the magnetic control device may be connected to an electric supply, etc., which cannot be described here.

In the embodiment, through the electrical slip ring 6, a power supply to the second driving mechanism 5 is realized. When the magnetic control device is operating, the first driving member 41 rotates to drive the transmission block 422 to rotate, the transmission block 422 rotates to drive the transmission shaft 423 to rotate, and the transmission shaft 423 rotates to drive the second support 2 to rotate, so as to drive the magnetic component 3 to rotate around the first axis L1.

In addition, in the present invention, the first ring body 61 is connected to the first support 1, and the second ring body 62 is connected to the second support 2. During the operation of the magnetic control device, when the second support 2 rotates relative to the first support 1, the second ring body 62 rotates integrally with the second support 2, while the first ring body 61 is connected to the first support 1 and therefore remains stationary. During the rotation of the second ring body 62 relative to the first ring body 61, the first cable connected to the first ring body 61 and the second cable connected to the second ring body 62 remain electrically connected. The second cable, the second ring body 62 and the second support 2 rotate synchronously, so that the second cable cannot be intertwined around the second support 2. The first cable is connected to the first ring body 61, and the first support 1, the first ring body 61 and the first cable are all in a stationary state without relative movement, so that the first cable cannot be intertwined around the first support 1. In the embodiment, the problem of cable intertwining is solved by a design of the electric slip ring 6.

In one possible embodiment, the electric slip ring 6 may comprise a PCB (Printed Circuit Board) type slip ring, and the first ring body 61 and the second ring body 62 are both annular sheet-shaped bodies. The sum of the thicknesses of the first ring body 61 and the second ring body 62 is less than or is equal to 8.5 mm. In the embodiment, the thickness of the electric slip ring is small, so that the magnetic control device has a compact structure and occupies less space.

The connecting plate 21 of the second support 2 is provided with a mounting hole. During the assembly process of the magnetic control device, one end of the transmission shaft 423 can pass through the mounting hole, and the other end of the transmission shaft 423 is limited at the mounting hole and is fixedly connected to the connecting plate 21 through a fastener. The electric slip ring 6 is sleeved on the transmission shaft 423, and then one end of the transmission shaft 423 away from the second support 2 is connected to the first support 1, the second ring body 62 of the electric slip ring 6 is fixedly connected to the connecting plate 21, and the first ring body 61 of the electric slip ring 6 is fixedly connected to the first support 1.

Referring to FIG. 1 and FIG. 3, in one possible embodiment, the second support 2 comprises a connecting plate 21 and side plates 22 respectively arranged on two opposite sides of the connecting plate 21. The first driving mechanism 4 is drivingly connected to the connecting plate 21, the housing portion 321 is accommodated between the side plates 22, the shaft portion 322 is rotatably connected to the side plates 22, and the second driving mechanism 5 is connected to the connecting plate 21 and/or the side plates 22.

Specifically, the second driving mechanism 5 comprises a second driving member 51 and a second transmission assembly 52. An input end of the second transmission assembly 52 is connected to the second driving member 51, and an output end of the second transmission assembly 52 is connected to the drive fitting portion 323 of the housing portion 321. The second driving member 51 drives the second transmission assembly 52, so that the second transmission assembly 52 drives the drive fitting portion 323 and the housing portion 321 to rotate.

Referring to FIG. 3 and FIG. 4, in one possible embodiment, the second support 2 further comprises a mounting base 23, a bearing seat 24 and a second bearing 25, wherein the mounting base 23 is connected to the connecting plate 21. The second driving member 51 comprises a motor, the motor is connected to the mounting base 23, the bearing seat 24 is connected to the mounting base 23, the second bearing 25 is sleeved on the bearing seat 24, the second gear 522 or the second belt pulley 523 is connected to the second bearing 25, the motor is connected to the second coupling 521, and the second coupling 521 is connected to the second gear 522 or the second belt pulley 523.

The second bearing 25 is preferably a deep groove ball bearing, the bearing seat 24 comprises a cylinder portion and a connecting portion, wherein the connecting portion is connected to the mounting base 23 and the cylinder portion is connected to the connecting portion. The second bearing 25 is sleeved on the cylinder portion, and the second gear 522 or the second belt pulley 523 is connected to the second bearing 25.

Figure 6:
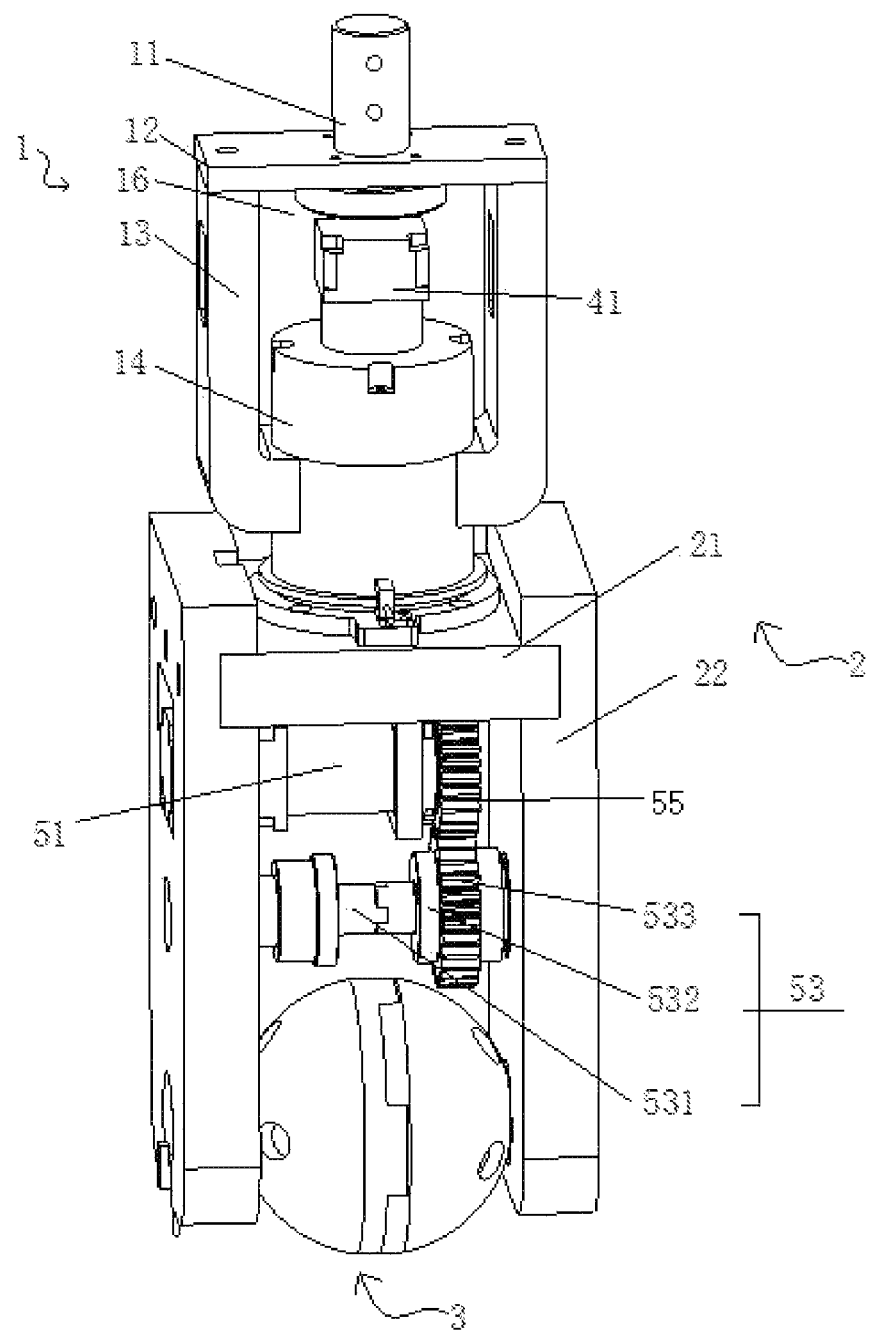
FIG. 6 is a schematic view showing a fourth three-dimensional structure of the magnetic control device according to the embodiments of the present invention.
Figure 7:
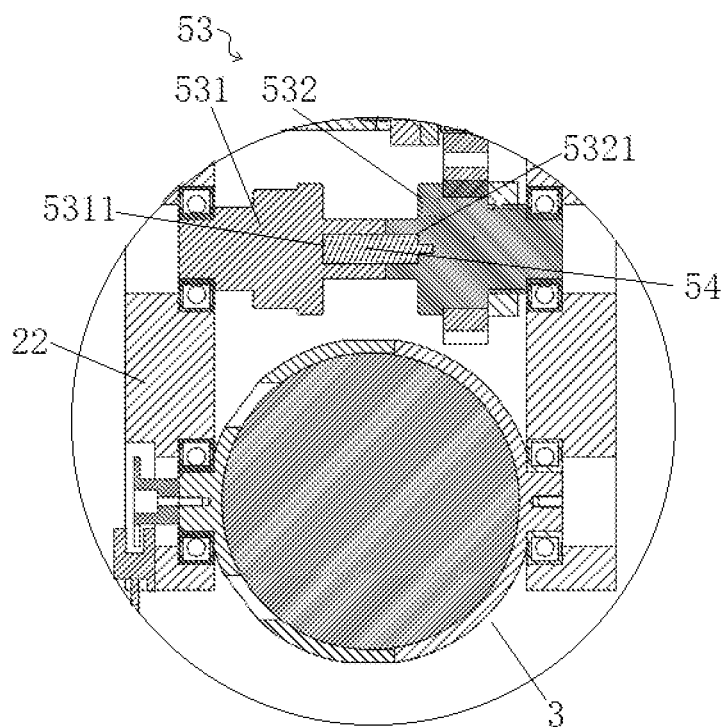
FIG. 7 is a partial sectional view of FIG. 6.

Referring to FIG. 6 and FIG. 7, in one possible embodiment, the second driving mechanism 5 comprises a second driving member 51, a rotor 53 and a permanent magnet 54. The second driving member 51 is drivingly connected to the rotor 53, and the permanent magnet 54 is mounted on the rotor 53. The second driving member 51 drives the rotor 53, so that the rotor 53 drives the permanent magnet 54 to rotate, so as to drive the magnetic component 3 to rotate.

In the embodiment, the magnetic component 3 is driven to move by the permanent magnet 54, eliminating the need for a transmission assembly, simplifying the internal transmission chain design, and reducing the size of the magnetic control device.

Figure 8:
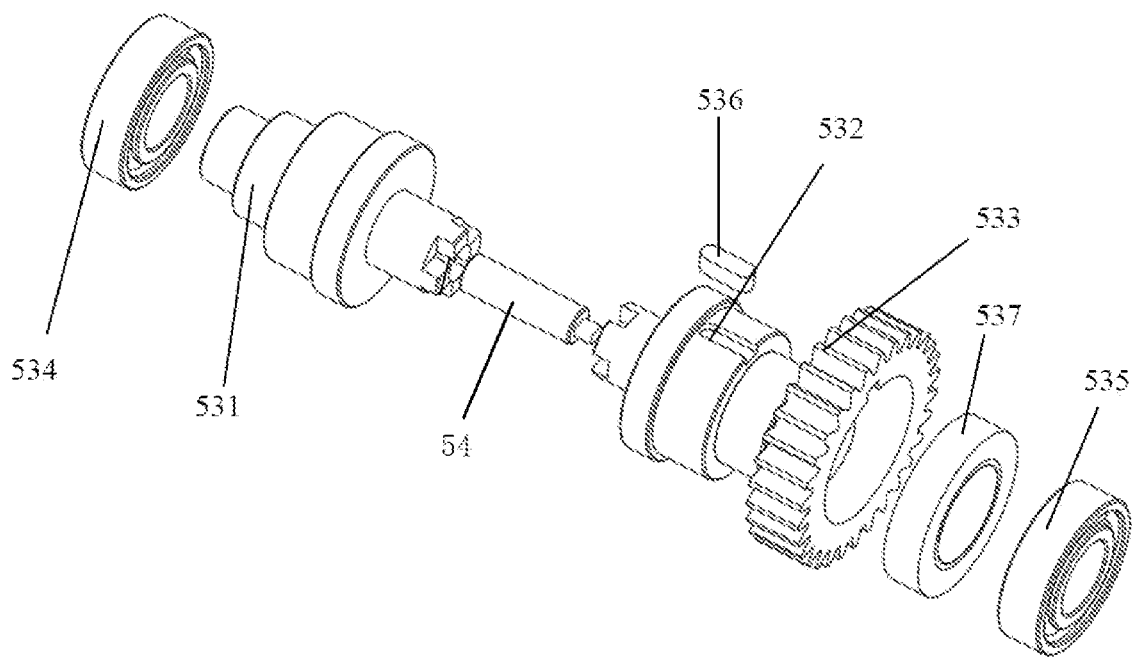
FIG. 8 is an exploded view of a rotor of the magnetic control device according to the embodiments of the present invention.

Referring to FIG. 6 to FIG. 8, in one possible embodiment, the rotor 53 comprises a first half shaft body 531 and a second half shaft body 532 connected to each other, wherein the first half shaft body 531 and the second half shaft body 532 are rotatably connected to the side plates 22 respectively, the first half shaft body 531 has a first groove 5311 and the second half shaft body 532 has a second groove 5321. When the first half shaft body 531 and the second half shaft body 532 are connected, the first groove 5311 and the second groove 5321 communicate with each other to form an accommodating cavity, and the permanent magnet 54 is fixed in the accommodating cavity. Referring to FIG. 8, the connection of the first half shaft body 531 and the second half shaft body 532 is provided with a snap protrusion and a fitting groove, so as to prevent the first half shaft body 531 and the second half shaft body 532 from rotating relatively. In other embodiments, the first half shaft body 531 and the second half shaft body 532 may be fastened in other ways (such as threaded connection or interference fit), which cannot be described herein.

In the embodiment, the rotor 53 comprises two half shaft bodies, and the middle of the two half shaft bodies after connected form an accommodating cavity for accommodating the permanent magnet 54. In this way, the permanent magnet 54 can be located in the middle of the rotor 53, which is convenient for driving the magnetic component 3 and replacing the permanent magnet 54 in the rotor 53.

Referring to FIG. 6, FIG. 7 and FIG. 8, the rotor 53 further comprises a third gear 533 that is sleeved on the second half shaft body 532. The second driving member 51 is drivingly connected to a fourth gear 55, and the fourth gear 55 is meshed with the third gear 533. In the embodiment, the second driving member 51 and the rotor 53 transmit power through the gear, so that power transmission is stable, and the rotating position of the magnetic component 3 can be accurately adjusted.

Specifically, the third gear 533 is sleeved on the second half shaft body 532, and the second half shaft body 532 is provided with a stop nut 537 to limit the third gear 533 to move in the axial direction. The second half shaft body 532 is provided with a key groove, and the third gear 533 is also provided with a tooth groove correspondingly. A key 536 is installed between the second half shaft body 532 and the third gear 533, and the key 536 can limit the third gear 533 to rotate along the second half shaft body 532. The first half shaft body 531 is connected to the side plate 22 through a left bearing 534, and the second half shaft body 532 is connected to the side plate 22 through a right bearing 535.

When the magnetic control device is powered on and initialized, an initial "zero" position is required, and at the zero position, the N pole of the magnet 31 faces upward and the S pole of the magnet 31 faces downward. Referring to FIG. 2 and FIG. 3, in the embodiment, a first zeroing mechanism 7 and a second zeroing mechanism 8 are designed. The positions of the magnet 31 in two directions are adjusted separately.

It should be noted that any zeroing mechanism capable of adjusting the magnetic control device to the zero position is within the protection scope of the present invention. In an exemplar embodiment, the first zeroing mechanism 7 may comprise a first code disk 71 and a first photoelectric switch 72, wherein the first code disk 71 is connected to the first support 1 and the first photoelectric switch 72 is mounted on the second support 2. The first photoelectric switch 72 comprises a first transmitting portion 721 and a first receiving portion 722 which are respectively arranged at two sides of the first code disk 71. The first code disk 71 is provided with a first through portion 711. When the second support 2 rotates to a position where the first receiving portion 722 can receive a signal from the first transmitting portion 721, the magnetic component 3 is located at an initial working position in a first direction. The first direction can be understood as a direction in which the magnetic component 3 rotates around the first axis L1.

Referring to FIG. 3, the second zeroing mechanism 8 comprises a second code disk 81 and a second photoelectric switch 82, wherein the second code disk 81 is connected to the shaft portion 322 and the second photoelectric switch 82 is connected to the second support 2. The second photoelectric switch 82 comprises a second transmitting portion 822 and a second receiving portion 823 which are respectively arranged on two sides of the second code disk 81. The second code disk 81 is provided with a second through portion 811. When the housing portion 321 rotates to a position where the second receiving portion 823 can receive a signal from the second transmitting portion 822, the magnetic component 3 is located at an initial working position in a second direction. The second direction can be understood as a direction in which the magnetic component 3 rotates around the second axis L2.

In other embodiments, the first zeroing mechanism 7 and/or the second zeroing mechanism 8 may also be other structures capable of adjusting the magnetic control device to the zero position. In the embodiment, the first zeroing mechanism 7 and the second zeroing mechanism 8 are so arranged that when the magnetic control device is powered on and initialized, the magnetic component 3 is rapidly adjusted to be at an initial "zero" position, and subsequent operations are facilitated.

The present invention further provides a capsule endoscope control system, which comprises the three-axis displacement base and the magnetic control device, wherein the magnetic control device is connected to the three-axis displacement base. The three-axis displacement base can drive the magnetic control device to move at three coordinate positions in space to adjust the position of the magnetic control device, and the magnetic control device provides an external magnetic field for the capsule endoscope, wherein the magnet 31 of the magnetic component 3 is preferably made of a magnetic material with little radiation damage to human body, such as neodymium iron boron, ferroferric oxide, samarium cobalt or aluminum nickel cobalt, etc.

The person skilled in the art realizes that the present invention by no means is limited to the preferred embodiments described above. On the contrary, many modifications and variations are possible within the scope of the appended claims. Any modifications, equivalent substitutions, improvements, etc. made within the spirit and principles of this disclosure are intended to be included within the scope of the present invention.

The invention claimed is:
1. A magnetic control device, comprises:
a support assembly, comprising a first support and a second support;
a magnetic component, comprising a housing portion and a shaft portion connected to the housing portion, wherein the housing portion is provided with a magnet and a drive fitting portion, and the shaft portion is rotatably connected to the second support;
a first driving mechanism, disposed on the first support and drivingly connected to the second support to drive the magnetic component to rotate around a first axis; and
a second driving mechanism, disposed on the second support and drivingly connected to the drive fitting portion to drive the magnetic component to rotate around a second axis; wherein the first axis intersects the second axis;

an electric slip ring, comprising a first ring body and a second ring body, which configured to rotate relative to each other;
a first zeroing mechanism, comprising a first code disk and a first photoelectric switch, wherein the first code disk is connected to the first support, and the first photoelectric switch is connected to the second support.

2. The magnetic control device of claim 1, wherein
the drive fitting portion is arranged around the housing portion with the second axis as a center line; and
the second driving mechanism is configured to drive the drive fitting portion to rotate to drive the housing portion to rotate around the second axis.

3. The magnetic control device of claim 1, wherein
the second driving mechanism comprises
a second driving member and a second transmission assembly,
wherein an input end of the second transmission assembly is connected to the second driving member and an output end of the second transmission assembly is connected to the drive fitting portion of the housing portion, and
the second driving member is configured to drive the second transmission assembly so that the second transmission assembly drives the drive fitting portion and the housing portion to rotate.

4. The magnetic control device of claim 1,
wherein the drive fitting portion comprises a first gear, and the first gear is sleeved on the housing portion; and
the second driving mechanism comprises at least a second gear, and the second gear is meshed with the first gear; or
the drive fitting portion comprises a first belt pulley, and the first belt pulley is sleeved on the housing portion;
the second driving mechanism comprises a second belt pulley and a belt, and
the belt is sleeved on the first belt pulley and the second belt pulley.

5. The magnetic control device of claim 1,
wherein the second support comprises:
a connecting plate and side plates respectively arranged on two opposite sides of the connecting plate;
the first driving mechanism is drivingly connected to the connecting plate;
the housing portion is located between the side plates, and the shaft portion is rotatably connected to the side plates; and
the second driving mechanism is connected to the connecting plate and/or the side plates.

6. The magnetic control device of claim 1, wherein
the second driving mechanism comprises a second driving member, a rotor and a permanent magnet;
wherein the permanent magnet is mounted on the rotor, the second driving member is drivingly connected to the rotor, and
the rotor is configured to drive drives the permanent magnet to rotate, then to drive the magnetic component to rotate.

7. The magnetic control device of claim 6, wherein
the rotor comprises a first half shaft body and a second half shaft body, which are connected to each other;
the first half shaft body has a first groove, and
the second half shaft body has a second groove;
the first groove and the second groove are configured to form an accommodating cavity, and the permanent magnet is fixedly arranged in the accommodating cavity.

8. The magnetic control device of claim 7, wherein
the rotor further comprises a third gear;
wherein the third gear is sleeved on the first half shaft body or the second half shaft body; and
the second driving member comprises a fourth gear that is meshed with the third gear.

9. The magnetic control device of claim 1, wherein
the first ring body is connected to the first support and is connected to a power supply unit of the magnetic control device through a first cable; and
the second ring body is connected to the second support and is connected to the second driving mechanism through a second cable.

10. The magnetic control device of claim 9, wherein the first ring body and the second ring body are both annular sheet-shaped bodies; and
the electric slip ring comprises a PCB type slip ring.

11. The magnetic control device of claim 1, wherein the first code disk is connected to the first support, and the first photoelectric switch is connected to the second support;
the first photoelectric switch comprises a first transmitting portion and a first receiving portion which are respectively disposed on two sides of the first code disk, and the first code disk is provided with a first through portion;
wherein the second support is configured to rotate to a position where the first receiving portion receives a signal from the first transmitting portion, while the magnetic component is located at an initial working position in a first direction.

12. The magnetic control device of claim 1, wherein the magnetic control device comprises a second zeroing mechanism;
the second zeroing mechanism comprises a second code disk and a second photoelectric switch;
the second code disk is connected to the shaft portion, and the second photoelectric switch is connected to the second support;
the second photoelectric switch comprises a second transmitting portion and a second receiving portion which are respectively disposed on two sides of the second code disk, and the second code disk is provided with a second through portion;
wherein the housing portion is configured to rotate to a position where the second receiving portion receives a signal from the second transmitting portion, the magnetic component is located at an initial working position in a second direction.

13. A capsule endoscope control system, comprising:
a three-axis displacement base and a magnetic control device connected to the three-axis displacement base;
wherein the magnetic control device comprises:
a support assembly, comprising a first support and a second support;
a magnetic component, comprising a housing portion and a shaft portion connected to the housing portion, wherein the housing portion is provided with a magnet and a drive fitting portion, and the shaft portion is rotatably connected to the second support;
a first driving mechanism, disposed on the first support and drivingly connected to the second support to drive the magnetic component to rotate around a first axis; and
a second driving mechanism, disposed on the second support and drivingly connected to the drive fitting portion to drive the magnetic component to rotate around a second axis, wherein the first axis intersects the second axis;

an electric slip ring, comprising a first ring body and a second ring body, configured to rotate relative to each other;

a first zeroing mechanism, comprising a first code disk and a first photoelectric switch, wherein the first code disk is connected to the first support, and the first photoelectric switch is connected to the second support.

14. The capsule endoscope control system of claim 13, wherein
the drive fitting portion is arranged around the housing portion with the second axis as a center line; and
the second driving mechanism is configured to drive the drive fitting portion to rotate to drive the housing portion to rotate around the second axis.

15. The capsule endoscope control system of claim 13, wherein
the second driving mechanism comprises
a second driving member and a second transmission assembly, wherein an input end of the second transmission assembly is connected to the second driving member, and
an output end of the second transmission assembly is connected to the drive fitting portion of the housing portion,
wherein the second driving member is configured to drive the second transmission assembly so that the second transmission assembly drives the drive fitting portion and the housing portion to rotate.

16. The capsule endoscope control system of claim 13, wherein the drive fitting portion comprises a first gear, and the first gear is sleeved on the housing portion; and wherein the second driving mechanism comprises at least a second gear, and the second gear is meshed with the first gear; or
the drive fitting portion comprises a first belt pulley, and the first belt pulley is sleeved on the housing portion; the second driving mechanism comprises a second belt pulley and a belt, and the belt is sleeved on the first belt pulley and the second belt pulley.

17. The capsule endoscope control system of claim 13, wherein the second support comprises a connecting plate and side plates respectively arranged on two opposite sides of the connecting plate;
the first driving mechanism is drivingly connected to the connecting plate;
the housing portion is located between the side plates, and the shaft portion is rotatably connected to the side plates; and
the second driving mechanism is connected to the connecting plate and/or the side plates.

18. The capsule endoscope control system of claim 13, wherein
the second driving mechanism comprises a second driving member, a rotor and a permanent magnet;
wherein the permanent magnet is mounted on the rotor, and the second driving member is drivingly connected to the rotor, so that the rotor drives the permanent magnet to rotate, and then drives the magnetic component to rotate.

19. The capsule endoscope control system of claim 13, wherein;
the first ring body is connected to the first support and is connected to a power supply unit of the magnetic control device through a first cable; and
the second ring body is connected to the second support and is connected to the second driving mechanism through a second cable.

* * * * *